(12) United States Patent
Cherubini et al.

(10) Patent No.: US 8,941,949 B1
(45) Date of Patent: Jan. 27, 2015

(54) WRITE HEAD

(71) Applicant: International Business Machines Corporation, Armonk, NY (US)

(72) Inventors: Giovanni Cherubini, Rueschlikon (CH); Johan B. C. Engelen, Rueschlikon (CH); Simeon Furrer, Rueschlikon (CH); Jens Jelitto, Rueschlikon (CH); Mark A. Lantz, Rueschlikon (CH); Hugo E. Rothuizen, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/278,791

(22) Filed: May 15, 2014

(51) Int. Cl.
*G11B 5/265* (2006.01)

(52) U.S. Cl.
USPC .......................................... 360/121

(58) Field of Classification Search
USPC .......... 360/121, 122, 125.39, 125.35, 125.48, 360/125.3; 29/603.13, 603.16, 603.12
See application file for complete search history.

(56) References Cited

U.S. PATENT DOCUMENTS

| | | | |
|---|---|---|---|
| 4,996,609 | A | 2/1991 | Joannou |
| 6,873,487 | B2 | 3/2005 | Molstad |
| 2013/0321953 | A1* | 12/2013 | Dellmann et al. ............ 360/121 |
| 2014/0126078 | A1* | 5/2014 | Biskeborn et al. ............ 360/48 |

FOREIGN PATENT DOCUMENTS

| | | |
|---|---|---|
| EP | 0 405 900 A2 | 1/1991 |
| EP | 0 443 460 A2 | 8/1991 |
| JP | 59030229 A | 2/1984 |
| WO | WO 2005/109405 A1 | 11/2005 |

\* cited by examiner

*Primary Examiner* — Allen T Cao
(74) *Attorney, Agent, or Firm* — Scully, Scott, Murphy & Presser, P.C.; Gail H. Zarick, Esq.

(57) ABSTRACT

A write head is provided for writing a servo pattern to a magnetic tape storage medium. The write head comprises at least a first write gap (A) and a second write gap (B), the first write gap (A) and the second write gap (B) being separately energizable. The second write gap (B) comprises at least a first section (a) and a second section (b). The first section (a) is designed such that an energization of the second write gap (B) causes a magnetic flux across the first section (a) insufficient for changing a magnetization of a track of the magnetic tape storage medium (TP) passing the first section (a) of the second write gap (B). The second section (b) is designed such that an energization of the second write gap (B) causes a magnetic flux across the second section (b) sufficient for magnetizing a track of the magnetic tape storage medium (TP) passing the second section (b) of the second write gap (B).

15 Claims, 6 Drawing Sheets

WRITE HEAD

FIELD OF THE INVENTION

The present invention relates to a write head for writing a servo pattern to a magnetic tape storage medium and to a method for writing a servo pattern to a magnetic tape storage medium.

BACKGROUND

Magnetic tape storage media typically comprise servo information prerecorded in one or more of dedicated servo bands that extend next to data tracks for storing data, which servo bands extend in a longitudinal direction along the tape medium. A servo band typically is read by a dedicated servo reader of a tape head of a tape drive, into which tape drive a cartridge containing the tape medium is inserted to. The read servo information allows for determining a lateral deviation of the tape medium from a lateral reference position, which lateral reference position is desired for correctly reading data from and writing data to the tape medium by dedicated read and write elements of the tape head. A position error signal supplied by the servo reader may be translated into a control signal for an actuator for controlling a lateral position of the tape head with respect to the tape medium.

BRIEF SUMMARY OF THE INVENTION

According to one aspect of the invention, a write head for writing a servo pattern to a magnetic tape storage medium is provided comprising at least a first write gap and a second write gap, the first write gap and the second write gap being separately energizable. The second write gap comprises at least a first section and a second section, wherein the first section is designed such that an energization of the second write gap causes a magnetic flux across the first section insufficient for changing a magnetization of a track of the magnetic tape storage medium passing the first section of the second write gap, and wherein the second section is designed such that an energization of the second write gap causes a magnetic flux across the second section sufficient for magnetizing a track of the magnetic tape storage medium passing the second section of the second write gap.

In embodiments, the write head may comprise one or more of the following features:
the first write gap and the second write gap are arranged in parallel with respect to their longitudinal extension;
the first write gap and the second write gap are inclined with respect to a motion direction of the tape storage medium passing the write head;
the first write gap and the second write gap are oriented perpendicular to the motion direction of the tape storage medium;
a minimum width of the first section of the second write gap is equal or larger than a maximum width of the second section of the second write gap;
a maximum width of the first section of the second write gap is larger than a maximum width of the second section of the second write gap;
a maximum width of the first section of the second write gap is at least 2 times larger than a maximum width of the second section of the second write gap;
a maximum width of the first section of the second write gap is at least 0.5 µm;
a width of the first write gap is constant along its longitudinal extension;
a width of the second section of the second write gap is constant along its longitudinal extension;
the width of the second section of the second write gap is equal to the width of the first write gap;
a width of the first section of the second write gap is constant along its longitudinal extension;
a width of the first section of the second write gap is varying along its longitudinal extension;
the first section of the second write gap is designed, in top view, as one of a circle, an ellipse, a rectangle, or a polygon;
first and second sections of the second write gap alternate along a longitudinal extension of the second write gap;
the second write gap comprises a third section, wherein the third section is designed such that an energization of the second write gap causes a magnetic field across the third section sufficient for magnetizing a track of the magnetic tape storage medium passing the third section of the second write gap, and wherein the third section is offset from the second section with respect to a motion direction of the tape storage medium;
the first section of the second write gap is asymmetric with respect to its longitudinal extension;
a symmetric axis of the second section of the second write gap is inclined with respect to a symmetric axis of the first section of the second write gap;
a third write gap being separately energizable from the first and the second write gap;
the third write gap comprises at least a first section and a second section;
the first section of the third write gap is designed such that an energization of the third write gap causes a magnetic flux across the first section of the third write gap insufficient for changing a magnetization of a track of the magnetic tape storage medium passing the first section of the third write gap, and the second section of the third write gap is designed such that an energization of the third write gap causes a magnetic flux across the second section of the third write gap sufficient for magnetizing a track of the magnetic tape storage medium passing the second section of the third write gap;
a first coil for generating a first magnetic flux when applying an electric current to the first coil;
a second coil for generating a second magnetic flux when applying an electric current to the second coil;
a first ring structure for guiding the first magnetic flux, the first ring structure comprising the first write gap;
a second ring structure for guiding the second magnetic flux, the second ring structure comprising the second write gap;
a portion of the first ring structure containing the first write gap and a portion of the second ring structure containing the second write gap are oriented in a common plane;
in addition to the third write gap one or more additional write gaps are comprised in the write head wherein independent current waveforms are applied to corresponding write coils for energizing the corresponding write gaps; and
another coil and another ring structure containing another write gap, preferably at an azimuth angle, which other ring structure is laterally offset from the first and second ring structures in a direction perpendicular to a motion direction of the tape for writing an additional servo pattern to the tape.

According to another aspect of the present invention, a method for writing a servo pattern to a magnetic tape medium is provided, in particular by means of a tape head write head according to any one of the previous embodiments. A servo band of the magnetic tape storage medium is moved across the at least two write gaps. A first current waveform is applied to a first write coil for energizing the first write gap. A second current waveform different to the first current waveform is applied to the second write coil for energizing the second write gap.

In a preferred embodiment, the first current waveform is a continuously alternating current at a first frequency, and the second current waveform is a continuously alternating current at a second frequency different to the first frequency. In another preferred embodiment, there are provided in addition to the third write gap one or more additional write gaps wherein independent current waveforms are applied to corresponding write coils for energizing the corresponding write gaps.

According to another embodiment of the present invention, a computer program medium is provided comprising computer code means for executing the method according to the above embodiment when executed on a processing unit.

It is understood that method steps may be executed in a different order than listed in a method claim. Such different order shall also be included in the scope of such claim as is the order of steps as presently listed.

Embodiments described in relation to the aspect of write head shall also be considered as embodiments disclosed in connection with any of the other categories such as the method.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE EMBODIMENTS

As an introduction to the following description, it is first pointed at a general aspect of the invention concerning a write head and a method for writing a servo pattern to a magnetic tape storage medium.

A magnetic tape storage medium for storing data—also abbreviated as tape—may be arranged in a cartridge which cartridge may be inserted into a tape drive for reading data from the magnetic tape storage medium and writing data to the magnetic storage tape medium. The magnetic tape storage medium has a longitudinal extension and a width orthogonal to its longitudinal extension. The tape is wound on one or more reels which are driven by the tape drive in order to make the tape pass by a tape head for reading and/or writing data from and/or to the magnetic tape storage medium. The magnetic tape storage medium typically is preformatted with servo information. This servo information in form of servo patterns enables the tape head during reading and/or writing data to pick up information as to a lateral position of the tape head with respect to the magnetic tape medium, which lateral position is a position orthogonal to the longitudinal extension of the magnetic tape storage medium. Such position information may be converted into a control signal for the tape head to laterally readjust in case a deviation from a lateral reference position is detected which lateral reference position is desired to be maintained by the tape head for correctly reading data from and writing data to the tape by dedicated read and write elements of the tape head. The deviation signal, also denoted as position error signal (PES), is typically supplied by a servo channel processing the signal from a dedicated servo reader of the tape head and may be translated into a control signal for an actuator for controlling the lateral position of the tape head with respect to the tape. Given that in one embodiment the servo reader and any other read and/or write element of the tape head are mechanically coupled and can commonly be actuated by the actuator, a rapid correction of the tape head deviation may be achieved during reading and/or writing data from and/or to the tape.

The servo information typically is preformatted on dedicated areas of the tape, also denoted as servo bands extending along the longitudinal extension of the tape. The servo information typically is prerecorded in the one or more servo bands by the tape manufacturer. The one or more servo bands extend next to data bands for storing data. Each data band may contain multiple data tracks, wherein each data track is provided for sequentially storing data. For recording servo patterns to the one or more servo bands, a write head is provided for doing so. Such write head is also denoted as servo format write head. Such servo format write head may be different in design and functionality from a tape head in a tape drive for writing data to the tape during operation.

Servo information may take different shape. In one preferred embodiment, a servo band may finally contain multiple servo tracks extending along a longitudinal extension of the servo band, i.e. along a longitudinal extension of the tape storage medium. Such multiple servo tracks may contain different servo patterns which allow for a precise position control. In one embodiment, the servo band may contain at least two servo tracks adjacent to each other. Preferably, the servo tracks adjacent to each other contain different servo patterns. A servo pattern of a servo track may be characterized by different frequencies of magnetic transitions or by different bit patterns. These at least two servo tracks can be used for more accurate position control.

Servo patterns arranged in different servo tracks may belong to a class of amplitude based servo (ABS) patterns. If such servo patterns of multiple servo tracks are read by one servo reader covering multiple of the servo tracks while reading, a readback signal from the servo reader provides different amplitudes at different frequencies subject to the coverage of the various servo patterns by the servo reader. By means of evaluating amplitudes of the readback signal at the various frequencies, a lateral position of the servo reader can be determined with respect to the tape. In case a read element for reading data and a write element for writing data are mechanically coupled with the servo reader, any lateral deviation of the servo reader detected by reading the servo band also is valid for the read element and the write element. Hence, any lateral actuation of the tape head including the servo reader, the read element and the write element may counterbalance the detected deviation and bring the read element and the write element back on their desired lateral positions. However, the present concept can also be used to write other kinds of servo patterns in various servo tracks of a servo band.

Figure 1:
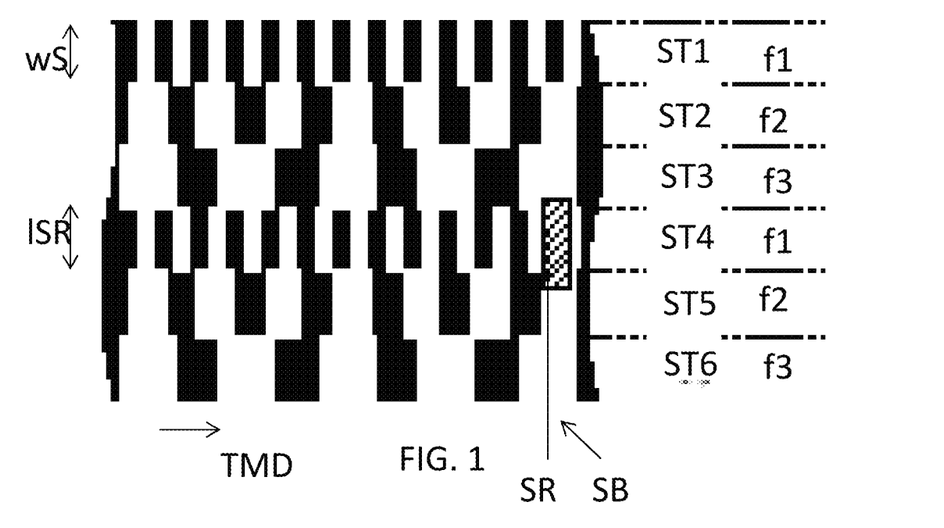
FIG. 1 a schematic top view on a servo pattern as a result of writing a servo pattern to the tape medium according to an embodiment of the present invention, FIG. 2 a top view on a magnetic tape storage medium, FIG. 3 a top view on a portion of a schematic write head according to an embodiment of the present invention, FIG. 4 a top view on a portion of a schematic write head according to another embodiment of the present invention, FIG. 5 a more elaborate top view on the servo write head of FIG. 3, in top view and in a side cut, FIG. 6 top views on various designs of write gaps, as may be used as second and/or third write gaps of write heads according to embodiments of the present invention, FIGS. 7 to 9 write heads in top view according to various embodiments of the present invention, FIG. 10 a schematic top view on a servo pattern as a result of writing a servo pattern to a magnetic tape storage medium according to an embodiment of the present invention, and FIG. 11 a flowchart representing a method for writing a servo pattern to a magnetic tape storage medium according to an embodiment of the present invention.

An example for such servo band SB is shown in FIG. 1 in top view. In the present example, the servo band SB contains six servo tracks ST1 to ST6 adjacent to each other. Each servo track STx contains a dedicated servo pattern comprising magnetic transitions at frequencies f1, f2 or f3. In the present example, f1>f2>f3. Every three servo tracks, the same servo pattern is applied, such that the servo tracks ST1 and ST4 contain the identical servo pattern. So do the servo tracks ST2 and ST5, and ST3 and ST6 respectively. Given that such servo patterns are prewritten to the servo band of the tape, a servo reader SR of a tape head may extend over multiple adjacent servo tracks STx during moving the tape in a tape drive in tape motion direction TMD. The servo reader SR in the present example has a longitudinal extension 1SR>wS with wS denoting a width of a servo track STx. The longitudinal extension 1SR of the servo reader SR presently is perpendicular to the longitudinal extension of the tape, i.e. the tape motion direction TMD in case of no skew angle between the tape media and the write head. At any lateral position, such servo reader SR provides a readback signal containing at least components of two of the three frequencies f1, f2, f3. Subject to the lateral position of the servo reader SR, amplitudes of these three frequency signal components vary. From the amplitudes, the lateral position can be derived.

The write head introduced is preferred to enable writing different servo patterns to different servo tracks of a servo band, such as, for example, the servo patterns according to FIG. 1. Preferably, such servo patterns are written to multiple adjacent servo tracks off the reel, i.e. the tape is required to pass the write head only once for writing the desired servo patterns.

In a preferred embodiment, continuous writing is applied for writing the servo patterns to the tape. In continuous writing, which is also denoted as trailing-edge writing, the write head continuously writes without interruption, i.e. a current applied to the tape head is continuously switched between positive and negative current values. This enables writing features that are much smaller than when using pulsed writing in which the current is switched on and off during passing the tape by the write head.

In a preferred embodiment, the write head comprises at least a first write gap and a second write gap, the first write gap and the second write gap being separately energizable. A write gap typically denotes a gap in a magnetically conductive portion of the write head, such as a ring portion, across which a magnetic flux may be energized by inducing a magnetic flux in the magnetically conductive portion of the write head, for example, by applying a current—also denoted as write current. The feature of the write gaps being separately energizable shall include the generation of magnetic fluxes across the subject write gaps independent from each other which may include the generation of magnetic fluxes at different times and at different magnitudes across the respective write gaps.

The provisioning of at least two write gaps may in one embodiment imply that in direction of tape motion the second—or more generally any subsequent—write gap may be in a position to overwrite the servo patterns written by energizing the first write gap. However, in case both write gaps would extend across an accumulated width of all servo tracks to be written, the second write gap would completely overwrite the servo patterns written by the first write gap. Hence, it is desired to design at least a first section of the second write gap such that an energization of the second write gap causes a magnetic flux across the first section insufficient for magnetizing a track of the magnetic tape storage medium passing the first section of the second write gap. Such track typically is the portion of the tape passing underneath or above the first section of the second write gap. "Insufficient for magnetizing" such servo track shall in particular include not being sufficient for modifying the servo pattern written by the first write gap. In contrast, a second section of the second write gap is designed such that an energization of the second write gap causes a magnetic flux across said second section which magnetic flux is sufficient for magnetizing a track of the magnetic tape storage medium passing the second section of the second write gap. Such track typically is the portion of the tape passing underneath or above the second section of the second write gap.

Hence, the second write gap is designed such that when energizing the second write gap e.g. by applying a current for evoking a magnetic flux across the second write gap, the first section is designed for leaving the servo pattern written by the first write gap as is while the second section of the second write gap is designed for overwriting the servo pattern written by the first write gap with a new servo pattern. Given that the second write gap preferably is energizable as a whole, the very same energization does not evoke an overwriting at the first section while it does evoke an overwriting at the second section. In a preferred embodiment, a width of the second write gap as a measure of the gap in direction of tape motion is smaller in the second section than in the first section such that for a given energization of the second write gap, e.g. by applying a predefined current to the assigned coil, the magnetic flux across the first, wider section is insufficient for magnetizing while the magnetic flux across the second, less wide section is sufficient for magnetizing.

Hence, the write head allows continuous parallel writing of all servo tracks within a servo band in one pass preferably with a single write head. At the same time, continuous writing can be applied for writing high-density servo patterns on the individual servo tracks.

In particular, adjacent servo tracks can be written with different servo patterns, for example with servo patterns of different frequencies in magnetic transitions. For example, the first and the second write gaps are arranged in series with respect to the direction of tape motion, such that the tape is first written by the first write gap, then by the second write gap, and then by another write gap if any. In this case, the second write gap overwrites parts of what has been written by the first write gap, and in particular parts that are passing by the second section of the second write gap while the servo pattern written by the first write gap remains in tracks that pass by the first section of the second write gap. As a result, servo tracks containing different servo patterns can be written to the tape since writing at the second write gap is disabled for one or more portions/servo tracks of the write gap length which denotes a longitudinal extension of the write gap perpendicular to the width of the write gap. Preferably, the write gaps are arranged in parallel to each other, and perpendicular with respect to a motion of the tape. However, the write gaps may not necessarily be of equal longitudinal extension. And, the first write gap may, for example, look similar to the second write gap. For example, if one wishes to write empty subtracks. The first write gap may not contain any gap in such section. Hence, in one embodiment, one or more of the write gaps may contain interruptions along a longitudinal extension of the respective gap, preferably at sections where a subsequent write gap is meant to (over-)write.

It is preferred, that the write head is embodied as a planar write head which includes that portions of the write head containing the at least first and second write gap are oriented in a common plane. This technology enables a small distance between the write gaps on the write head. For example, such fabrication process allows placing separately energizable write gaps in close proximity such as 40 microns or less. A close proximity between the write gaps in turn makes the servo patterns less sensitive to dynamic skew between the tape media and the write head during formatting.

The present idea also allows writing multiple parallel high-density pattern servo tracks with a well-determined phase relationship between the servo patterns of adjacent servo tracks which is important for pseudo-noise sequences. For pseudo-noise sequence patterns, the phase-alignment between adjacent tracks is important. A phase misalignment is equal to the product of a velocity variation during formatting and a distance between the write gaps. Since the distance between the write gaps may be considered low in the present case, the phase misalignment is limited.

Especially when using a planar write head approach, short current switching times on the order of several nanoseconds may be achieved and continuous writing is supported without overheating the write head while in conventional write heads servo patterns are written by applying short pulses to the write head thereby imprinting servo stripes of at least the extent of a magnetic write bubble that spills out of the write gap.

The present idea also minimizes side erasing effects. Side erasing refers to the writing of a track thereby erasing a fraction of an earlier written adjacent track. Side erasing reduces the signal quality at the track edge and hence performance, and also impacts linearity and dynamic range.

Figure 2:
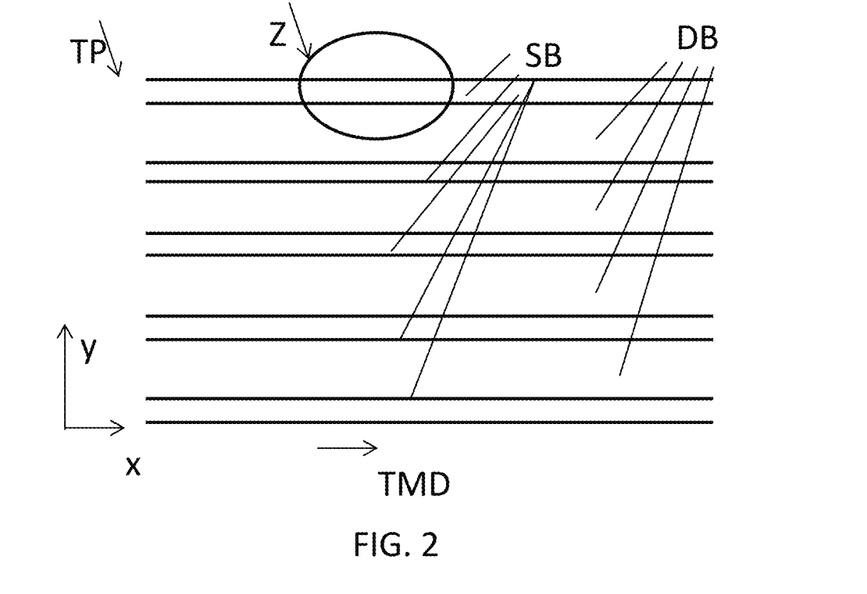

FIG. 2 illustrates a schematic top view on a section of a tape TP for illustrating a servo pattern to be written by embodiments of the present invention. The tape TP has a longitudinal extension in x direction and a lateral extension in y direction. The longitudinal extension in x direction is parallel to a tape motion direction TMD provided there is no skew. Servo bands SB and data bands DB extend along the longitudinal extension of the tape TP. Each data band DB is arranged in between two servo bands SB. Each data band DB contains multiple data tracks not shown in detail wherein preferably multiple of these data tracks of a data band DB are written and/or read simultaneously in case a tape head of the tape drive provides multiple write and/or read elements. Each servo band SB contains servo patterns arranged along the longitudinal extension of the tape TP, and preferably containing servo tracks STx such as shown in FIG. 1. In particular, the cutout Z of the top most servo band may be illustrated in FIG. 1.

Figure 3:
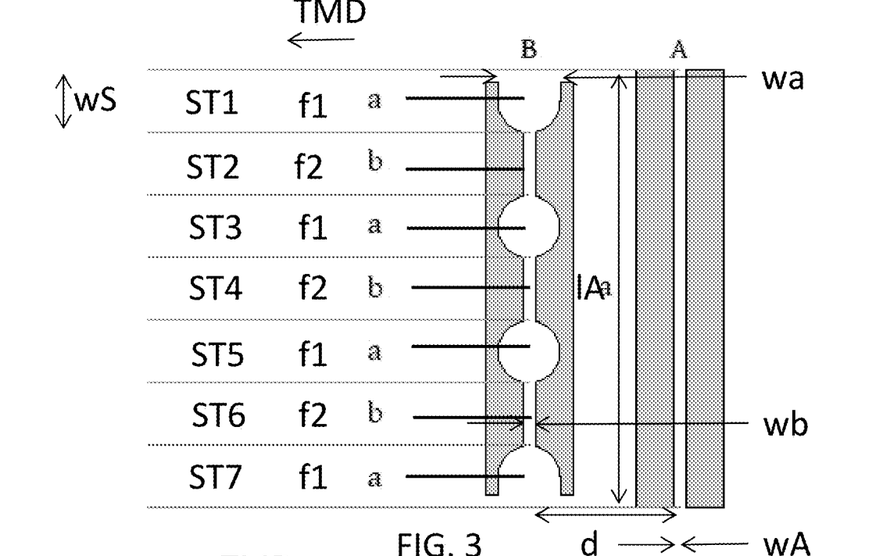

FIG. 3 illustrates a top view on a portion of a schematic write head according to an embodiment of the present invention. The write head contains a first write gap A and a second write gap B. The write gaps A,B are represented by the white areas framed by shaded areas which shaded areas represent portions of magnetically conductive material of the write head. The write gaps A,B are arranged behind each other in a direction of tape motion TMD. The first write gap A has a width wA which is sufficiently small for being energized sufficiently to write a servo pattern to the tape portion passing the first write gap, which typically is the servo band or at least a portion of the servo band. Preferably, the first write gap is continuously energized by means of an alternating current with frequency f1 such that a servo pattern as illustrated in servo tracks ST1 and ST4 in FIG. 1 is written to the tape, however, all across the servo tracks ST1 to ST6 due to a longitudinal extension 1A of the first write gap A. Hence, the write gaps A, B are preferably longitudinally dimensioned such that they cover the entire range of the servo band servo tracks ST1 . . . STx to be written to.

At a distance d from the first write gap A, the second write gap B is arranged. Both write gaps A and B are oriented perpendicular to the tape motion direction TMD. The second write gap B contains multiple first sections a and multiple second sections b in alternating manner. The second sections b show a width wb which is small and especially may be equal to the width wA of the first write gap A. The width wa of the first sections a of the second write gap B is varying. Given that the shape of the first sections a is a circle in top view, a maximum width wa of said first section a is equal to a diameter of the circle. This maximum width wa exceeds the width wb of the section b by far. Especially, the maximum width wa of the first section is designed such that the air gap is big enough for evoking only a small or no magnetic flux across the first section a of the second write gap B thus not inducing a change in magnetization of the tape, and especially of the portion of the tape that passes by underneath or above the first section. Such portion may also be interpreted as one or more tracks. Hence, even when the second write gap B is energized, the first sections a do not overwrite the pattern previously written by the first write gap A. Instead, only the second sections b of the second write gap B are designed and dimensioned such that these second sections b overwrite what is written by the first write gap A. This means that all second sections b allow for writing their own servo tracks b with width wS corresponding to a length of the second sections b. Hence, an energization, e.g. in form of a current applied at a second frequency f2>f1 results in writing a second servo track ST2 with a second servo pattern next to the first servo track ST1. According to the alternating arrangement of first and second sections a,b in the second write gap B, multiple servo tracks STx may be written adjacent to each other with the different servo patterns f1 and f2 alternating across the adjacent servo tracks STx.

Figure 4:
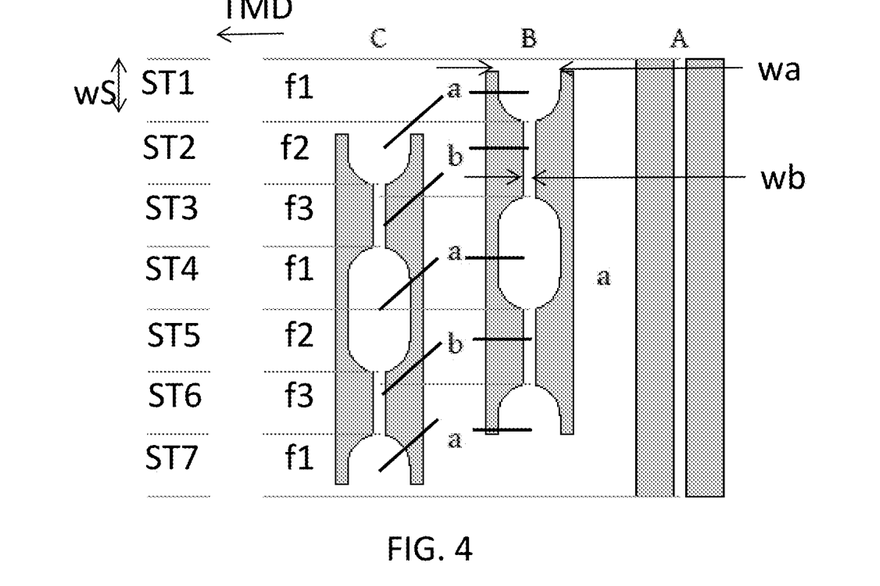

FIG. 4 illustrates a top view on a portion of a schematic write head according to another embodiment of the present invention. The write head contains a first write gap A, a second write gap B and a third write gap C. The write gaps A, B and C are arranged subsequently in a direction of tape motion TMD. The first write gap A again has a width wA which is sufficiently small that when the first write gap A is energized a magnetic tape storage medium passing the first write gap A above or underneath the first write gap A is magnetically written to. Especially, the first write gap A is continuously energized by means of an alternating current with frequency f1 such that a servo pattern as illustrated in servo track ST1 in FIG. 1 is written across all future servo tracks ST1-ST7 to the tape.

At a distance d from the first write gap A, the second write gap B is arranged. The second write gap B contains multiple first sections a and multiple second sections b in alternating manner. The second sections b show a width wb which is small and especially may be equal to the width wA of the first write gap A. The shape of the first section a can be derived from FIG. 4. The top and the bottom first sections represent half of such structure. A maximum width wa of said first sections a is equal to the diameter of the circle end section. This maximum width wa exceeds the width wb of the sections b by far. Especially, the maximum width wa of the first sections a is designed such that the air gap is big enough for inducing only a small or no magnetic flux across the first sections a of the second write gap B which magnetic flux in turn does not change the magnetization of the tape, and especially of the portion of the tape that passes by underneath or above the first sections a, which portion may also be interpreted as one or more servo tracks. Hence, even when the second write gap B is energized, the first sections a do not overwrite the pattern previously written by the first write gap A. Instead, only the second sections b of the second write gap B are designed and dimensioned such that these sections b overwrite what is written by the first write gap A when being energized. Hence, an energization, e.g. in form of a current may be applied at a second frequency f2>f1 to the second write gap B such that servo tracks ST2 and ST5 with a second servo pattern f2 may be written next to the servo tracks ST1, ST3, ST4 and ST6 containing the first servo pattern f1.

At a distance from the second write gap B, the third write gap C is arranged. The third write gap C contains multiple first sections a and multiple second sections b in alternating manner. For the general shape of the first and second sections a,b it is referred to the second write gap B. However, the third write gap C is offset from the second write gap B in a longitudinal direction of the write gaps. Again, even when the third write gap C is energized as a whole, the corresponding first sections a do not overwrite the servo patterns previously written by the first and second write gaps A and B. Instead, only the second sections b of the third write gap C are designed and dimensioned to overwrite what was written by the first or second write gap A, B before. An energization, e.g. in form of a current may be applied at a third frequency f3 to the third write gap C with f3>f2>f1 finally results in a servo band SB containing six servo tracks ST1-ST6 according to FIG. 1.

Borders between the generated servo tracks STx are self-aligned, by partially overwriting what an earlier write gap wrote. Note that by using a similar write gap geometry, it is possible to write any sequence of patterns a, b, and c with a corresponding write gap design. The idea is easily extended to more patterns or different sub-track widths.

Figure 5:
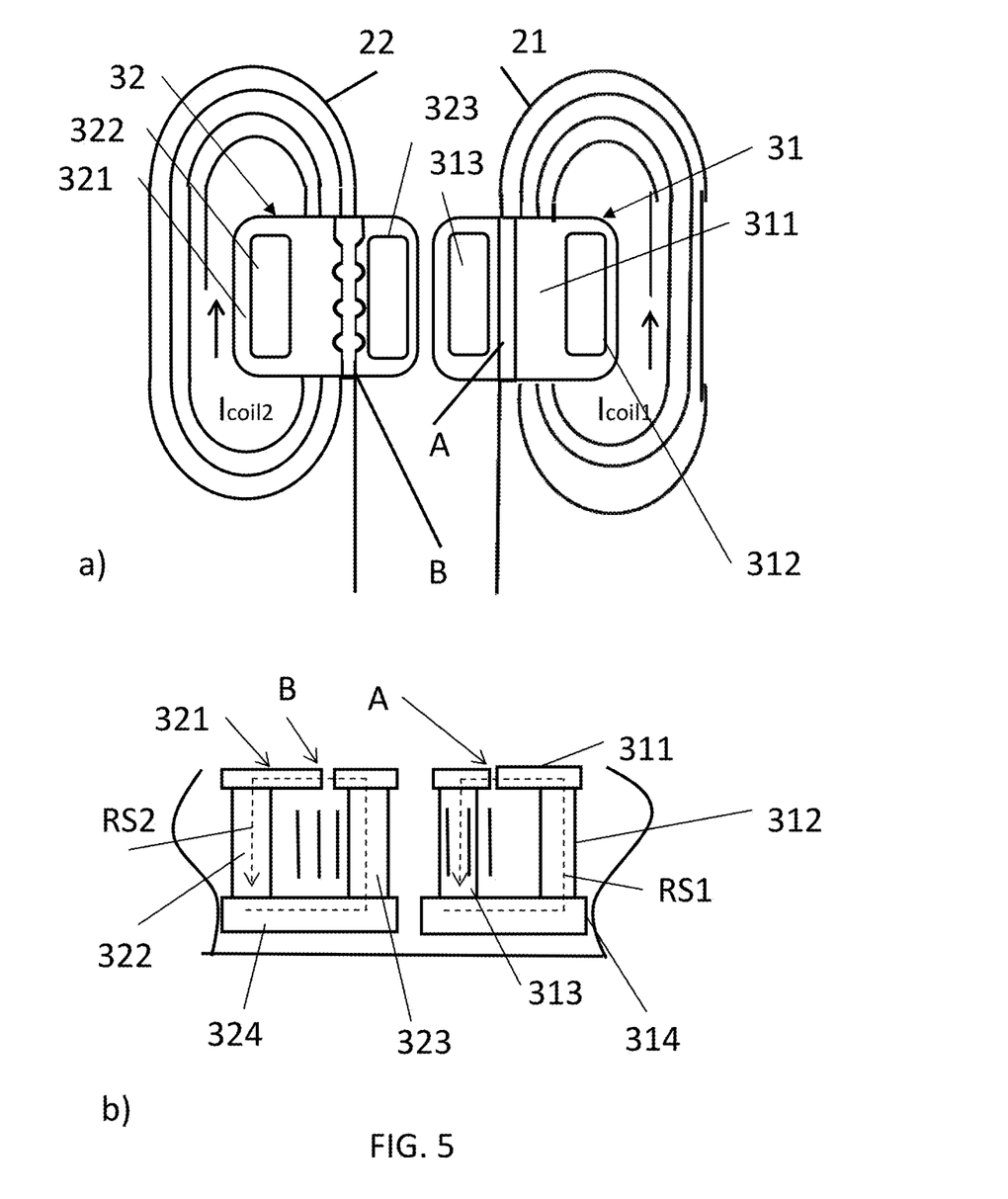

FIG. 5a illustrates a more elaborate top view on the servo write head of FIG. 3. The write head contains two coils 21 and 22, wherein each coil 21, 22 generates a magnetic field when an electric current $I_{coil1}$, $I_{coil2}$ is applied to the subject coil 21, 22. Two pole piece structures 31 and 32 are provided for guiding the generated magnetic fluxes. Top poles 311 and 321 of which pole piece structures 31 and 32 are visible in FIG. 5a. As can be derived from FIG. 5b which is a side cut of FIG. 5a, the pole piece structures 31 and 32 each comprise a ring structure RS1 and RS2 which are indicated in FIG. 5b by dashed circles. The ring structures RS1 and RS2 are defined by the respective top pole 311, 321, a respective yoke 312, 322 around which the first and second coils 21, 22 are respectively wound, another respective yoke 313, 323, and respective bottom poles 314, 324. The top pole 311 contains the first write gap A, and the top pole 321 contains the second write gap B.

In the present embodiment, the two write gaps A and B and the underlying top poles 311 and 321 are oriented in a common plane which is the plane of the planar top poles 311 and 321. Given that such plane may be the tape bearing surface and may be the plane of a wafer from which the top poles are fabricated the present write head may be denoted as planar write head. The tape typically is guided across the top poles 311, 321, i.e. in parallel to the plane of projection in FIG. 5a, with the servo band to be written passing across the top poles 31 and 32. In case of continuous writing, alternating currents are continuously applied to the coils 21 and 22, preferably at different frequencies as explained above. Hence, an example of a write head is introduced with two write gaps A, B being driven by two independently controllable pancake coils 21, 22 which can be fabricated using thin film technology. The present write head represents a two-tone/sequence servo track write head wherein the second write gap B partially overwrites the servo pattern written by the first write gap A, resulting in, in this case, eight servo tracks. Distance d between the first and the second write gap A, B can be designed to be below 300 micron, allowing a precise phase-alignment between sequences written by the write gaps A and B.

Figure 6:
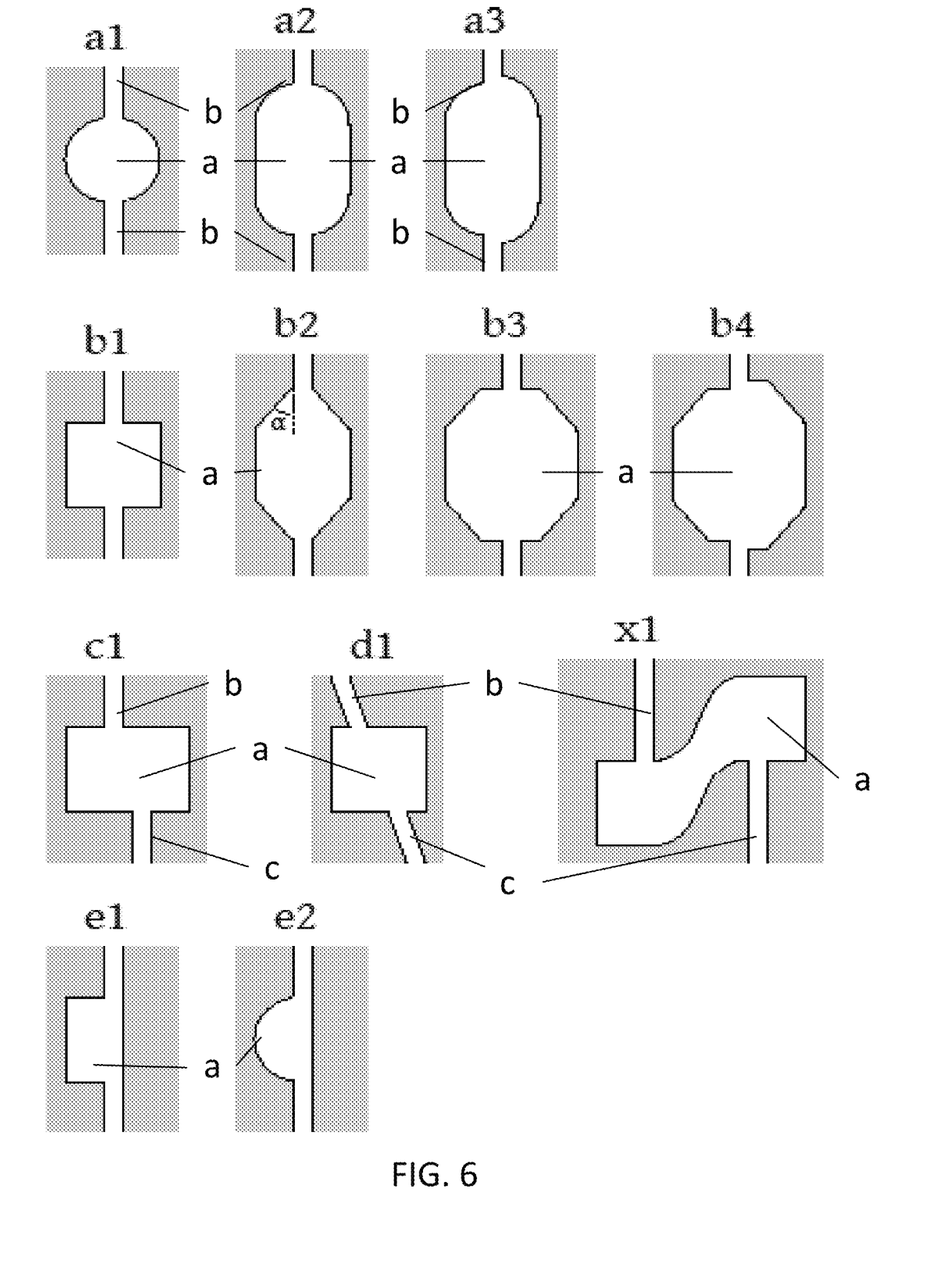

FIG. 6 illustrates top views on various designs of write gaps, all in top view, as may be used as second and/or third write gaps of a write head according to embodiments of the present invention. Only portions may be shown, in particular first sections a with beginnings of second sections b, which write gap building blocks preferably may be placed in series (repeated) multiple times to form a complete second and/or third write gap. The present selection of the shapes of first sections a represents write gaps that locally disable writing due to wide middle portions.

The shape of the first sections a in FIGS. 6a1 and 6a2 are already known from FIGS. 3 and 4 and represent a circle and an elongated circle as first section a. In FIG. 6a3, shape of the first section a of FIG. 6a2 is modified in that the first section a now is asymmetric with respect to a longitudinal axis of the write gap. This asymmetry may result in a lesser extent of fringing fields at the edges of sections b, resulting in a preferably straighter shape and more abrupt lateral edges of the imprint of sections b written to tape.

The shape of first sections a in FIGS. 6b1 to 6b4 shows non-curved boundaries in the form of polygons, such as a rectangle in FIG. 6b1, and other polygons in the remaining figures. Again, in FIG. 6b4, the shape of the first section a of FIG. 6b3 is modified in that the first section a now is asymmetric with respect to a longitudinal axis of the write gap. The effect is the same as described with respect to FIG. 6a3.

The shapes of write gaps as shown in FIGS. 6c1, 6d1 and 6x1 have in common that the second section b and a third section c of the write gap, which both are connected to the first section a, are offset with respect to each other. This results in different phase relations between the servo pattern written by the second section b and the servo pattern written by the third section c given that a current waveform applied to the subject coil results in a magnetic field that is uniform for all sections b and c of the write gap. In addition, in FIG. 6d1 the second and the third sections b,c are inclined with respect to a tape motion direction other than orthogonal such that it is accounted for the case in which a servo reader operates at a given angle which may be the case when the tape head of the tape drive is tilted with respect to the tape motion direction during operation of the tape drive. What is specific to the design of FIG. 6x1 is that two adjacent servo tracks can be written with the same transition pattern sequence that is applied to the write gap, however at different phases with respect to each other.

The designs of FIGS. 6e1 and 6e2 represent asymmetric variations of FIG. 6b1 and FIG. 6a1 respectively.

Figure 7:
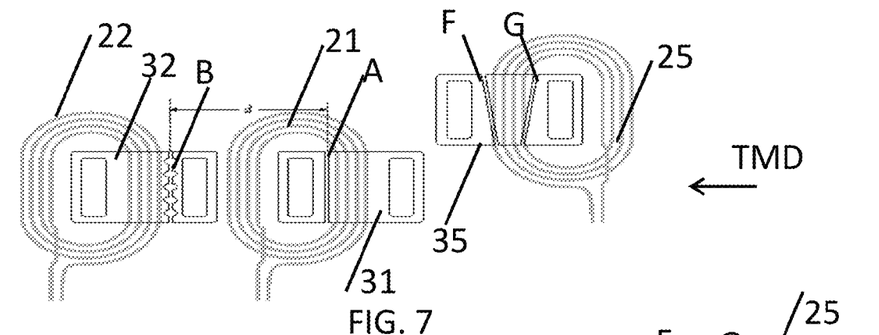

FIG. 7 illustrates a schematic top view on a write head according to an embodiment of the present invention. While the two left hand coils 21 and 22 and pole structures 31 and 32 contribute to an assembly as introduced in FIG. 3 or 5, another coil 25 and another pole piece structure 35 are introduced and are laterally offset from the first and second pole piece structures 31 and 32. By means of the other coil 25 and the other pole piece structure 35, a timing based servo pattern may be written to a remaining portion of the servo band next to the servo tracks written by means of the first and second coil 21, 22.

Figure 10:
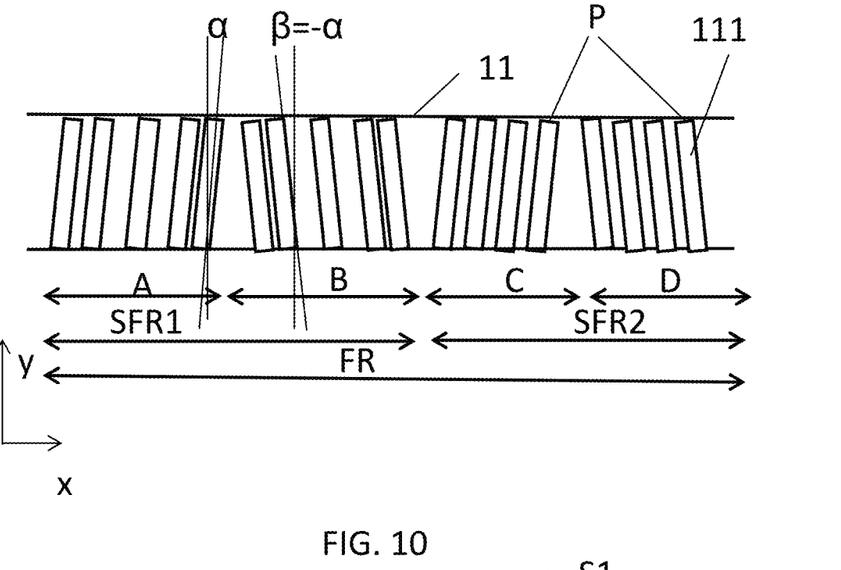

FIG. 10 illustrates such a timing based servo pattern. Timing-based servo (TBS) is a technology developed specifically for linear tape drives in the late '90s. In TBS systems, recorded servo patterns comprise transitions with at least two different azimuthal slopes. The tape head lateral position may be derived from the relative timing of pulses generated by a servo reader reading the servo pattern. TBS was adopted by the linear tape open (LTO) consortium, and a complete format for LTO tape drives of the first generation was standardized by the European Computer Manufacturers Association (ECMA) in 2001 as ECMA-319. The servo patterns in LTO are written on five dedicated servo bands that straddle four data bands.

The servo information in TBS is organized in multiple servo frames with each servo frame containing a servo pattern. A servo frame may, for example, be considered as a unit containing servo information according to a specific arrangement. In the present embodiment, a servo frame, and preferably each servo frame of the servo band may contain multiple bursts. Each burst preferably includes a sub-pattern which in the present embodiment is defined by an orientation of multiple stripes arranged in parallel to each other. Preferably each stripe shows an asymmetry such that for any position of the servo reader offset from its lateral reference position pulses in the servo read back signal show up at different times with respect to pulses that originate from a servo reader being positioned in its reference position, e.g. on the centerline of the TBS pattern.

FIG. 10 provides an illustration of a sample servo pattern in a servo frame FR containing two servo sub-frames SFR1 and SFR2 according to an embodiment of the present invention. In the present example, the servo frame FR comprises eighteen servo stripes 111 organized in four bursts A, B, C and D of five or four stripes. Each stripe 111 is oriented at an azimuthal angle $\alpha$ or $\beta$ with respect to the lateral extension of the tape 1 in y-direction, in the present example of either $\alpha=+6°$ or $\beta=-\alpha=-6°$. Hence, a burst may be interpreted as a set of stripes parallel to each other. In a first one of the at least two bursts the at least two servo stripes are inclined at a first angle with respect to a direction orthogonal to the longitudinal extension of the tape medium, which angle is also referred to as azimuthal angle. The first burst is followed by a second burst in which second burst the at least two servo stripes are inclined at a second angle with respect to a direction orthogonal to the longitudinal extension of the tape, which second angle is different from the first angle. This means, that the stripes of neighboring bursts are not parallel to each other. In a preferred embodiment, the first angle is $+\alpha$ while the second angle is $\beta=-\alpha$ with respect to the lateral axis. In such arrangement of stripes within consecutive bursts, an interval between pulses generated by the servo reader when scanning the first and the second burst indicates a lateral position of the servo reader, and as such a deviation of the servo reader from its reference position, and as such a deviation of the position of the tape head relative to the tape media. For example, in case the lateral reference position is in the middle of the servo band and the servo head is offset from such middle position, a distance between a stripe of the first burst to a stripe of the second burst in a lateral offset situation is different than a corresponding distance when the servo reader matches the reference position in the middle of the servo band due to the stripes inclined at different angles in the two bursts. A different distance is reflected in a varied timing of pulses supplied by the servo reader when scanning across the first and second servo burst. Hence, a timing based evaluation of the position error signal supplied in form of pulses by the servo reader is performed.

While reading and/or writing data from and/or to the tape, the tape moves relative to a tape head in the longitudinal direction x. In addition, the tape head preferably is movable in the lateral direction y, i.e., transverse to the direction x, by means of a suitable actuator. However, due to a lateral offset of the tape with respect to the tape head, a misalignment of both may occur. For realigning the tape with the tape head, the position of the tape head relative to the tape is estimated from a relative timing of pulses (a.k.a. dibits) generated by a servo reader reading the servo stripes/patterns from the one or more servo bands during tape drive operation. In particular, a servo channel can estimate a tape velocity by measuring a time difference between pairs of stripes with identical azimuthal angle, e.g. between A- and C-burst stripes/pulses and B- and D-bursts stripes/pulses. By comparing the relative timing of pulses generated by pairs of stripes with opposite azimuthal angles, e.g. between A- and B-burst stripes and C- and D-bursts stripes, combined with the above mentioned velocity estimate, the servo channel can further estimate the lateral position of the tape head. In case that a deviation between the tape head and the tape is determined, a control unit may, in a closed-loop control, control the actuator of the tape head and laterally reposition the tape head such that the tape head is laterally realigned with the tape.

Generally, additional information may be encoded in the servo frames of the servo band. For example, such additional information may be encoded into code words of length g by using an M-ary alphabet of symbols with M >1. Given that a number of g symbols contribute to the code word, in one embodiment g servo frames may be used for representing a code word wherein each servo frame contains a symbol of such code word. Specifically, the alphabet A may be a binary alphabet with symbols "0" and "1". In each consecutive servo frame a single symbol may be encoded, i.e. either a "0" or a "1". However, a sequence of symbols may also be encoded in consecutive servo frames with added redundancy to allow for error correction.

In another embodiment of the present invention, additional information may be encoded into the servo patterns. Specifically, a single symbol of an M-ary alphabet may be encoded per servo frame. Therefore for encoding a word containing x digits, x servo frames may be used. Within a servo frame, the symbol may be encoded redundantly in more than one servo burst, or may not be encoded redundantly on a servo burst basis such that only a single burst holds the encoded information. Within a servo burst, and provided that a servo burst holds a sub-pattern in form of a set of parallel stripes, only a subset of the set of stripes may be used for encoding a symbol. Specifically, the additional information may be information as to a presently scanned longitudinal position of the tape. Such longitudinal position information, also denoted as LPOS, may in one embodiment be encoded in the servo patterns. Hence, the longitudinal position of the tape may be identified based on the LPOS information read by the servo reader. The LPOS information may be used for winding the tape media to a given longitudinal position and, for example, starting reading and/or writing at such specified longitudinal position. Other information such as manufacturing information may be added too, which, for example, may indicate the manufacturer of the tape cartridge, the date of manufacturing the tape cartridge, information as to the standard the present cartridge may conform to, etc.

In one embodiment, the additional information may be encoded by an offset of certain stripes in a burst, such as the second and fourth stripe in the A- and B-burst of the example of FIG. 10.

In another embodiment, polarity modulation of stripes may be used as means of encoding the additional information. I.e., one or more stripes may be written at different polarity by that encoding the additional information.

Typically, pulsed writing is used for writing TBS servo patterns to a servo band. Hence, the other coil 25 of FIG. 7 may undergo pulsed writing. The write gaps F and G of the other pole piece structure 35 are inclined and as such are designed for writing stripes with azimuthal angles such as shown in FIG. 10.

Figure 8:
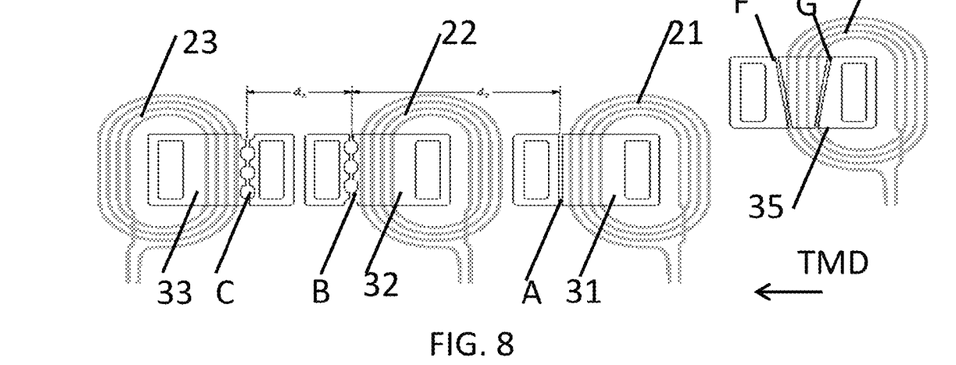

FIG. 8 differs from FIG. 7 in that a write head according to FIG. 4 is implemented for writing the multiple servo tracks. Hence, the assembly includes a further coil 23 and a further pole piece structure 33 with a third write gap C of FIG. 4 being arranged in the further pole piece structure 33. By means of this embodiment, servo tracks such as depicted in FIG. 1 can be written with a stripe pattern written by the other coil 23 and the other pole piece structure 35 above the servo tracks of FIG. 1.

Figure 9:
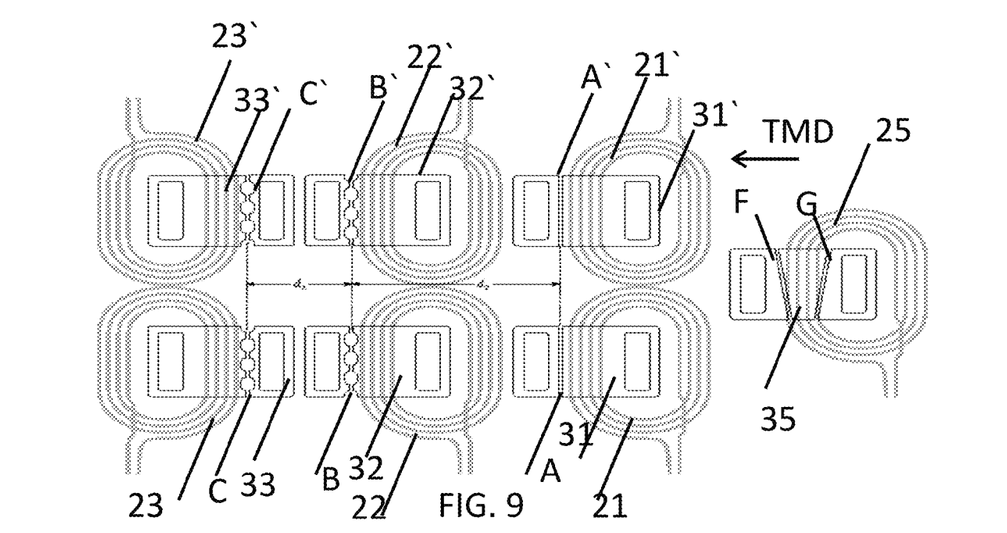

FIG. 9 illustrates a further embodiment of a write head in top view, which fully comprises the elements of the write head of FIG. 8. Another write head component including coils 21', 22', 23', pole piece structures 31', 32', 33'; and write gaps A', B', C' is added on top of the three write gap arrangement A, B and C of identical shape. By means of such write head a servo band may be prewritten with a first set of servo tracks according to FIG. 1, a TBS pattern underneath, and another set of servo tracks according to FIG. 1 underneath the TBS pattern.

In all embodiments of FIGS. 7 to 9, the other coil/pole piece structure arrangement building a TBS writer can be placed before or after the high-density ABS writers in tape motion direction TMD.

Figure 11:
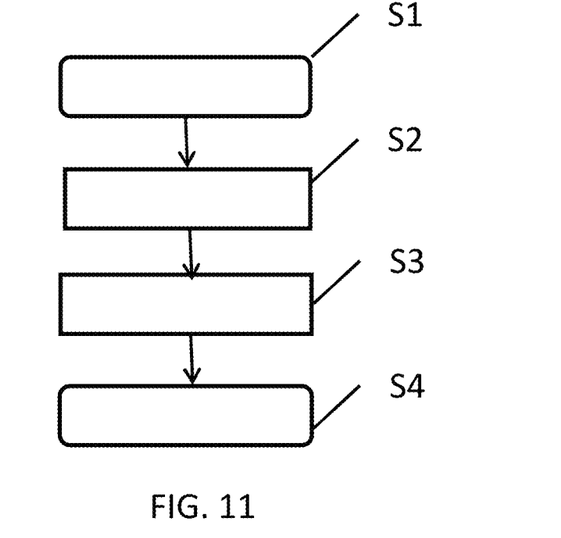

For all embodiments, it is preferred, that the write head may be built on a common single substrate FIG. 11 shows a flow chart according to an embodiment of the present invention. In step S1, the servo pattern writing process is started. In step S2, a servo band of the magnetic tape storage medium is moved across the at least two write gaps. In step S3, a continuous alternating current is applied at a first frequency to a first write coil for continuously energizing the first write gap. In step S3, a continuous alternating current at a second frequency different to the first frequency is applied to a second write coil for continuously energizing the second write gap. Steps S2 and S3 are preferably executed in parallel. In step S4, the servo write process is terminated, preferably when the entire servo band is prewritten.

It will be understood by those skilled in the art that many modifications and permutations may be made without departing from the scope of the present invention. For example, generalizations with different number write gaps, coils, or pole piece structures, are easily possible.

As will be appreciated by one skilled in the art, aspects of the present invention may be embodied as a write head, a method for writing servo information or a computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A write head for writing a servo pattern to a magnetic tape storage medium, comprising at least a first write gap (A) and a second write gap (B), the first write gap (A) and the second write gap (B) being separately energizable,
   wherein the second write gap (B) comprises at least a first section (a) and a second section (b),
   wherein the first section (a) is designed such that an energization of the second write gap (B) causes a magnetic flux across the first section (a) insufficient for changing a magnetization of a track of the magnetic tape storage medium (TP) passing the first section (a) of the second write gap (B), and
   wherein the second section (b) is designed such that an energization of the second write gap (B) causes a magnetic flux across the second section (b) sufficient for magnetizing a track of the magnetic tape storage medium (TP) passing the second section (b) of the second write gap (B).

2. The write head according to claim 1, wherein the first write gap (A) and the second write gap (B) are arranged in parallel with respect to their longitudinal extension,
   wherein the first write gap (A) and the second write gap (B) are inclined with respect to a motion direction (TMD) of the tape storage medium (TP) when passing the write head, and
   in particular wherein the first write gap (A) and the second write gap (B) are oriented perpendicular to the motion direction (TMD) of the tape storage medium (TP).

3. The write head according to claim 1, wherein a minimum width of the first section (a) of the second write gap (B) is equal or larger than a maximum width (wb) of the second section (b) of the second write gap (B), and
   a maximum width (wb) of the second section (b) of the second write gap (B) is smaller than a maximum width (wa) of the first section (a) of the second write gap (B), and
   wherein a maximum width (wb) of the second section (b) of the second write gap (B) is 2 times smaller than a maximum width (wa) of the first section (a) of the second write gap (B).

4. The write head according to claim 1, wherein a maximum width (wa) of the first section (a) of the second write gap (B) is at least 0.5 μm.

5. The write head according to claim 1, wherein a width (wA) of the first write gap (A) is constant along its longitudinal extension,
   wherein a width (wb) of the second section (b) of the second write gap (B) is constant along its longitudinal extension, and wherein the width (wb) of the second section (b) of the second write gap (B) is equal to the width (wA) of the first write gap (A).

6. The write head according to claim 1, wherein a width (wa) of the first section (a) of the second write gap (B) is constant along its longitudinal extension.

7. The write head according to claim 1, wherein the first section (a) of the second write gap (B) is designed, in top view, as one of a circle, an ellipse, a rectangle, or a polygon.

8. The write head according to claim 1, wherein first and second sections (a, b) of the second write gap (B) alternate along a longitudinal extension of the second write gap (B).

9. The write head according to claim 1, wherein the second write gap (B) comprises a third section (c), wherein the third section (c) is designed such that an energization of the second write gap (B) causes a magnetic field across the third section (c) sufficient for magnetizing a track of the magnetic tape storage medium (TP) passing the third section (c) of the second write gap (B), and wherein the third section (c) is offset from the section (b) with respect to a motion direction (TMD) of the magnetic tape storage medium (TP).

10. The write head according to claim 1, wherein the first section (a) of the second write gap (B) is asymmetric with respect to its longitudinal extension.

11. The write head according to claim 1, wherein a symmetric axis of the second section (b) of the second write gap (B) is inclined with respect to a symmetric axis of the first section (a) of the second write gap (B).

12. The write head according to claim 1, further comprising: a third write gap (C) being separately energizable from the first and the second write gap (A,B), wherein the third write gap (C) comprises at least a first section (a) and a second section (b),
   wherein the first section (a) of the third write gap (C) is designed such that an energization of the third write gap (C) causes a magnetic flux across the first section (a) of the third write gap (C) insufficient for changing the magnetization of a track of the magnetic tape storage medium (TP) passing the first section (a) of the third write gap (C), and
   wherein the second section (b) of the third write gap (C) is designed such that an energization of the third write gap (C) causes a magnetic flux across the second section (b) of the third write gap (C) sufficient for magnetizing a track of the magnetic tape storage medium (TP) passing the second section (b) of the third write gap (C).

13. The write head according to claim 1, further comprising:
   a first coil (21) for generating a first magnetic flux when applying an electric current to the first coil (21),
   a second coil (22) for generating a second magnetic flux when applying an electric current to the second coil (22),
   a first ring structure (RS1) for guiding the first magnetic flux, the first ring structure (RS1) comprising the first write gap (A),
   a second ring structure (RS2) for guiding the second magnetic flux, the second ring structure (RS2) comprising the second write gap (B), and
   wherein a portion of the first ring structure (RS1) containing the first write gap (A) and a portion of the second ring structure (RS2) containing the second write gap (B) are oriented in a common plane.

14. The write head according to claim 13, further comprising: another coil and another ring structure containing another write gap, in particular at an azimuth angle, which other ring structure is laterally offset from the first and second ring structures in a direction perpendicular to a motion direction of the tape for writing an additional servo pattern to the tape.

15. A method for writing a servo pattern to a magnetic tape medium by means of a tape head comprising:
   moving a servo band of a magnetic tape storage medium (TP) across at least two write gaps (A,B) of said tape head,
   applying a first current waveform ($I_{coil}$) to a first write coil (21) for energizing the first write gap (A), and applying a second current waveform ($I_{coil2}$) different to the first waveform ($I_{coil1}$) to a second write coil (22) for energizing the second write gap (B).

\* \* \* \* \*